(12) United States Patent
Shimawaki

(10) Patent No.: US 7,178,079 B2
(45) Date of Patent: Feb. 13, 2007

(54) RECEPTION DATA SYNCHRONIZING APPARATUS AND METHOD, AND RECORDING MEDIUM WITH RECORDED RECEPTION DATA SYNCHRONIZING PROGRAM

(75) Inventor: Kazuhiro Shimawaki, Saitama-ken (JP)

(73) Assignee: Advantest Corporation, Tokyo (JP)

( * ) Notice: Subject to any disclaimer, the term of this patent is extended or adjusted under 35 U.S.C. 154(b) by 205 days.

(21) Appl. No.: 10/806,257

(22) Filed: Mar. 23, 2004

(65) Prior Publication Data

US 2006/0041785 A1 Feb. 23, 2006

Related U.S. Application Data

(62) Division of application No. 09/712,844, filed on Nov. 15, 2000, now Pat. No. 6,980,617.

(30) Foreign Application Priority Data

Nov. 15, 1999 (JP) ................................ 11/323624

(51) Int. Cl.
*G01R 31/28* (2006.01)
(52) U.S. Cl. ..................................... 714/744
(58) Field of Classification Search ................ 714/744, 714/704, 738; 375/368, 365
See application file for complete search history.

(56) References Cited

U.S. PATENT DOCUMENTS 5,463,639 A * 10/1995 Koishi et al. ................ 714/740

* cited by examiner

*Primary Examiner*—James C Kerveros
(74) *Attorney, Agent, or Firm*—Lowe Hauptman & Berner, LLP

(57) ABSTRACT

A synchronism pattern detecting timing recorder (20) records a synchronism pattern detecting timing at which a synchronism pattern is detected in reception data, a synchronism decider (12) collates the reception data with reference data to decide whether or not the reception data is consistent in phase with the reference data, and a timing generator (22) operates, when the synchronism decider (12) gives a decision for inconsistency in phase, for a match between the synchronism pattern detecting timing recorded in the synchronism pattern detecting timing recorder (20), as a subsequent one, and a timing of a synchronism pattern of the expectation data, and the subsequent synchronism pattern detecting timing in record is used to render the phases consistent, allowing for a rapid synchronization to be obtained, without the need of waiting a detection of synchronism pattern, even with an inconsistency in phase due to a false synchronism pattern.

8 Claims, 8 Drawing Sheets

RECEPTION DATA SYNCHRONIZING APPARATUS AND METHOD, AND RECORDING MEDIUM WITH RECORDED RECEPTION DATA SYNCHRONIZING PROGRAM

This application is a Divisional Application Under Rule 53 (b) of application Ser. No. 09/712,844 filed on Nov. 15, 2000 now U.S. Pat. No. 6,980,617, which in turn is a Continuation of Japanese Patent Application No. 323624/1999 filed on Nov. 15, 1999, and priority is hereby claimed under 35 USC 119 based on this application.

BACKGROUND OF THE INVENTION

1. Field of the Invention

The present invention relates to a measurement of bit errors, and particularly, to acquisition of a synchronization between reception data past a DUT (Device Under Test) and expectation data by detecting synchronism patterns contained in the reception data and the expectation data.

2. Description of the Related Art

In cases of data communications by optical fibers there occurs a case causing a bit error. It is then necessary to detect the bit error to be corrected. FIG. 8 shows a system arrangement for making a detection of bit error.

A first pattern generator 52 gives electric data to a DUT (device under test as an element to be measured) 60. The DUT 60 has an E/O (electric/optic) converter 61, O/E (optic/electric) converter 62, and an optical fiber 63. The electric data given to the DUT 60 is converted by the E/O converter 61 into light, which is transmitted through the optical fiber 63 and returned by the O/E converter 62 again into electric data. The data output from the DUT 60 is called reception data.

A second pattern generator 54 generates expectation data for collation with the reception data. At a collator 56, the reception data is collated with the expectation data to find part of the reception data inconsistent with the expectation data, if any, as an inconsistent part to be a bit error.

At the collator 56, for collation between the reception data and the expectation data, there is needed a synchronism to be obtained between the reception data and the expectation data. There is thus detected a synchronism pattern contained in the reception data, and the expectation data is generated in accordance with the detected timing, thereby obtaining a synchronism.

SUMMARY OF THE INVENTION

However, the reception data contains also a false synchronism pattern, which is not a synchronism pattern, but has like data to the synchronism pattern. Or there is a case in which, due to a bit error of the reception data, a pattern different of data from the synchronism pattern is recognized as a synchronism pattern. Such a pattern can also be deemed as a false synchronism pattern. If an erroneous synchronization is resulted from a false synchronism pattern, there is an inconsistency in phase.

It therefore is an object of the present invention to provide a reception data synchronizing apparatus that allows a synchronization to be obtained between reception data and expectation data even with an inconsistency in phase due to a false synchronism pattern.

According to one aspect of the present invention, a reception data synchronizing apparatus is disclosed for obtaining synchronization between reception data having a plurality of synchronism patterns and expectation data as an expected value of the reception data. A synchronism pattern detecting timing recording means records a first synchronism pattern detecting timing at which a first of the plurality of synchronism patterns is detected in the reception data. A collation and synchronism decision means collates the reception data with the expectation data to decide whether or not the reception data is consistent in phase with the expectation data according to the first synchronism timing. The synchronism pattern detecting timing recording means, when the collation and synchronism decision means gives a decision for inconsistency in phase, records a second synchronism timing as the first synchronism timing. The second synchronism timing is a timing at which a second of the plurality of synchronism patterns is detected.

In a reception data synchronizing apparatus arranged as above-noted, even with an inconsistency in phase between reception data and reference data, it is after a synchronism timing at which a synchronism pattern when synchronized is detected that a detection of the synchronism pattern restarts to make the reception data and the reference data consistent in phase, thus allowing for the reception data to be synchronized with expectation data even with an inconsistency in phase due to a false synchronism pattern.

According to another aspect of the present invention, a reception data synchronizing method is disclosed for obtaining synchronization between reception data having a plurality of synchronism patterns and expectation data as an expected value of the reception data. A synchronism pattern detecting timing recording step for recording a synchronism pattern detecting timing at which a first of the plurality of synchronism patterns is detected in the reception data. A collation and synchronism decision step for collating the reception data with the expectation data to decide whether or not the reception data is consistent in phase with the expectation data according to the first synchronism timing. The synchronism pattern detecting timing recording step when the collation and synchronism decision step gives a decision for inconsistency in phase, records a second synchronism timing as the first synchronism timing. The second synchronism timing is a timing at which a second of the plurality of synchronism patterns is detected.

In a reception data synchronizing apparatus arranged as above-noted, even with an inconsistency in phase between reception data and reference data, it is by a match between a next synchronism pattern detecting timing and a timing of a synchronism pattern of expectation data that the reception data and the reference data are made consistent in phase, thus allowing for the reception data to be synchronized with the expectation data even with an inconsistency in phase due to a false synchronism pattern.

Further, the next synchronism pattern detecting timing in record is used to render the reception data and the reference data consistent in phase, without the need of waiting a detection of synchronism pattern, thus allowing for a rapid synchronization to be obtained between the reception data and the expectation data.

In yet another aspect of the present invention, a computer-readable medium embodying a program of instructions for execution by the computer to perform a reception data synchronizing method is disclosed for obtaining synchronization between reception data having a plurality of synchronism patterns and expectation data as an expected value of the reception data. A synchronism pattern detecting timing recording step for recording a synchronism pattern detecting time at which a first of the plurality of synchronism patterns is detected in the reception data. A collation and synchronism decision step for collating the reception data with the expectation data to decide whether or not the reception data is consistent in phase with the expectation data according to the first synchronism timing. The synchronism pattern detecting timing recording step when the collation and synchronism decision step gives a decision for inconsistency in phase, records a second synchronism timing as the first synchronism timing. The second synchronism timing is a timing at which a second of the plurality of synchronism patterns is detected.

In a reception data synchronizing apparatus arranged as above-noted also, there can be obtained a synchronization between reception data and expectation data even with an inconsistency in phase due to a false synchronism pattern, like the invention of claim 2.

Further, a phase difference in record is used to render the reception data and reference data consistent in phase, without the need of waiting a detection of synchronism pattern, thus allowing for a rapid synchronization to be obtained between the reception data and the expectation data.

In a further aspect of the present invention, a reception data synchronizing apparatus for obtaining synchronization between reception data having a plurality of synchronism patterns and expectation data as an expected value of the reception data is disclosed. A synchronism pattern detecting timing recording device that records a first synchronism pattern detecting timing at which a first of the plurality of synchronism patterns is detected in the reception data. A collation and synchronism decision device that collates the reception data with the expectation data to decide whether or not the reception data is consistent in phase with the expectation data according to the first synchronism timing. The synchronism pattern detecting timing recording device, when the collation and synchronism decision device gives a decision for inconsistency in phase, records a second synchronism timing as the first synchronism timing. The second synchronism timing is a timing at which a second of the plurality of synchronism patterns is detected.

Further, a phase difference in record is used to render the reception data and the reference data consistent in phase, without the need of waiting a detection of synchronism pattern, thus allowing for a rapid synchronization to be obtained between the reception data and the expectation data.

DESCRIPTION OF THE PREFERRED EMBODIMENTS

First Embodiment

Figure 1:
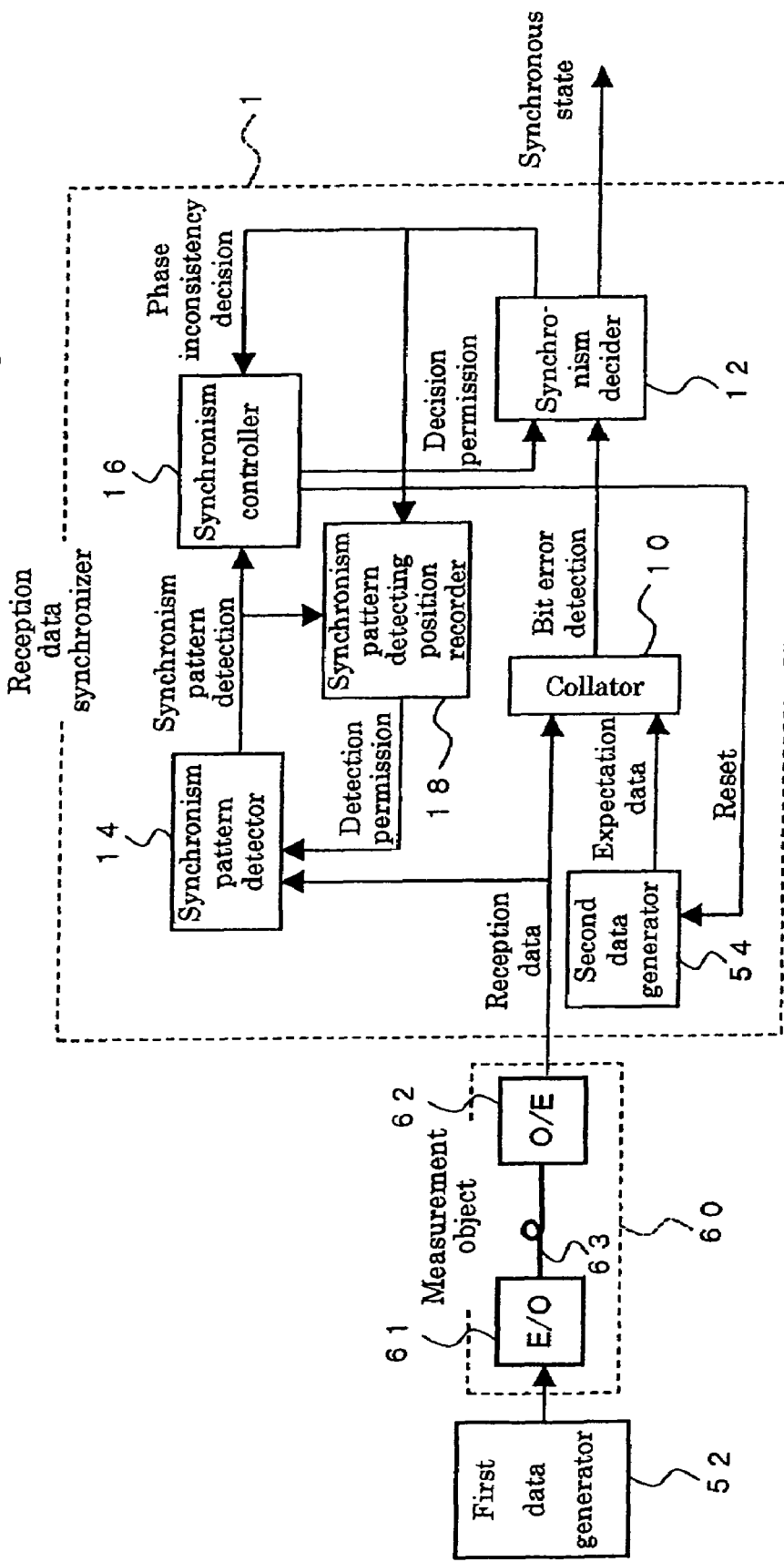
FIG. 1 is a block diagram showing the arrangement of a reception data synchronizer according to a first embodiment of the invention.

There will be described below a first embodiment of the invention with reference to the drawings. First, there is described the arrangement of a reception data synchronizer according to a first embodiment. FIG. 1 is a block diagram showing the arrangement of the reception data synchronizer according to the first embodiment.

The reception data synchronizer 1 includes a collator 10, a synchronism decider 12, a synchronism pattern detector 14, a synchronism controller 16, a synchronism pattern detecting position recorder 18, and a second data generator 54.

The collator 10 performs a collation between input reception data and expectation data, detecting a different data between the two data, bit by bit, that is, for a detection of bit error.

The reception data input to the collator 10 is output from a first pattern generator 52 via a DUT 60. The DUT 60 includes an E/O (electric/optical) converter 61, an O/E (optical/electric) converter 62, and an optical fiber 63. At both ends of the optical fiber 63 are connected the E/O converter 61 and the O/E converter 92. To the E/O converter 61 is connected the first pattern generator 52, and to the O/E converter 62, the collator 10. The expectation data input to the collator 10 is input from the second data generator 54.

The synchronism decider 12 decides whether or not the reception data and the expectation data have consistent phases, that is, if they are in synchronism. The decision for synchronism is made for a synchronism to be decided if bit errors detected at the collator 10 are under a predetermined amount. If they are out of synchronism, their phases are inconsistent, causing a great amount of different data. Thus, a consistency in phase can be decided by this method. The synchronism decider 12, when deciding phases to be inconsistent, transmits the effect to a synchronism controller 16 and a synchronism pattern detecting position recorder 18 to be described later.

The synchronism pattern detector 14 is adapted, in a state of the later-described synchronism pattern detecting position recorder 18 providing a permission for a detection of synchronism pattern, for detecting a synchronism pattern from the reception data to notify information of the detection timing to the later-described synchronism controller 16 and the synchronism pattern detecting position recorder 18.

The synchronism controller 16 is adapted, when notified of a synchronism pattern detection from the synchronism pattern detector 14, to release the second data generator 54 from a reset state and, at a timing at which a position of the detected synchronism pattern and a position of a synchronism pattern of the expectation data are consistent, to have the second data generator 54 generate the expectation data, permitting the synchronism decider 12 to make a decision of synchronism. It is further adapted, upon reception of a phase inconsistency from the synchronism decider 12, to reset the second data generator 54, initializing the second data generator 54 so that the expectation data stops at a predetermined phase until the resetting becomes released.

The synchronism pattern detecting position recorder 18 records a timing (position) where the synchronism pattern of the reception data is detected. Further, upon reception of a notification of phase inconsistency from the synchronism decider 12, it permits the synchronism pattern detector 14 to detect a synchronism pattern from a position next to the position in the reception data at which the synchronism pattern is detected.

Figure 2:
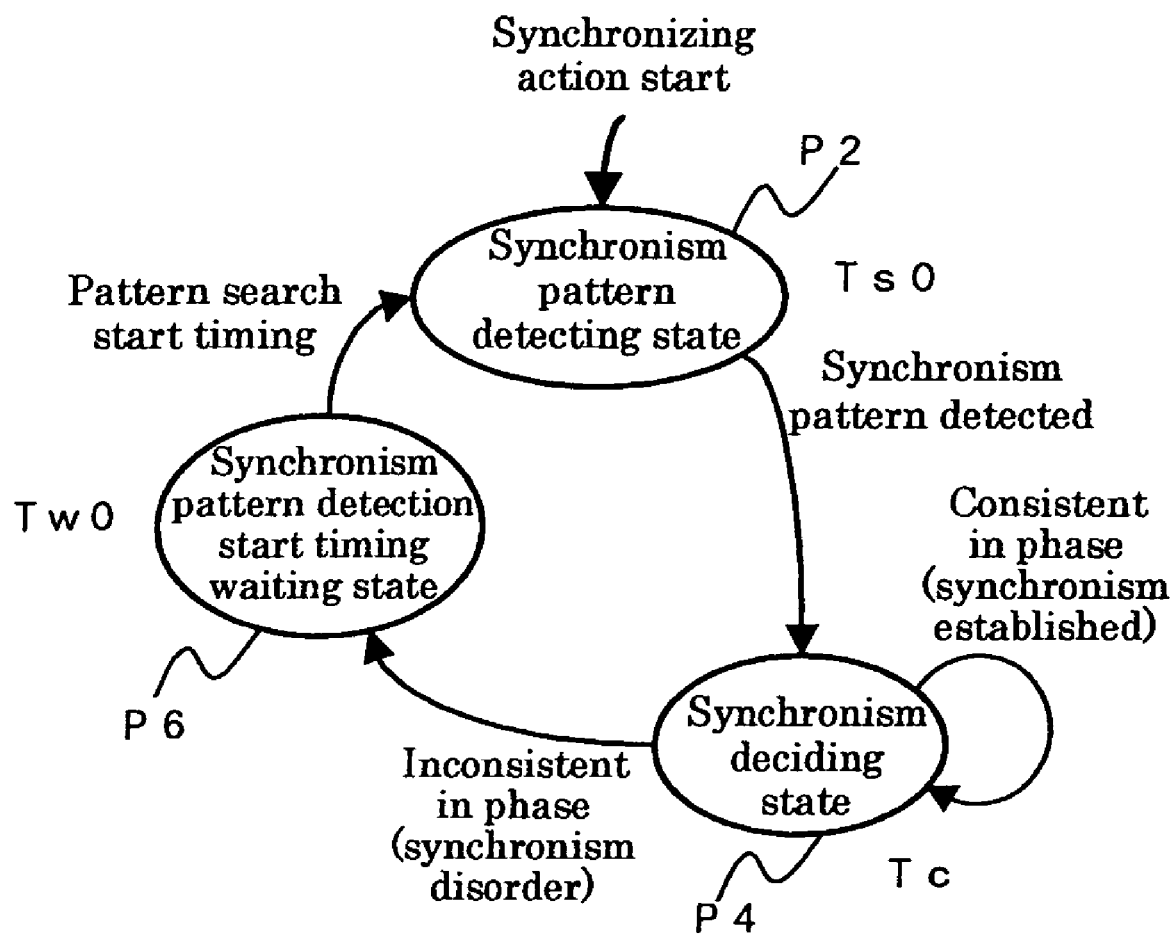
FIG. 2 is a status transition diagram showing actions of the first embodiment.

Next, there are described actions of the first embodiment by using a status transition diagram of FIG. 2. Ts0, Tc, and Tw0 are necessary times for P2, P4, and P6, respectively. From the first pattern generator 52 is input reception data, via the DUT 60, to the synchronism pattern detector 14. At the synchronism pattern detector 14, there is detected a synchronism pattern in the reception data (P2).

The synchronism pattern detector 14 having detected the synchronism pattern in the reception data notifies the synchronism controller 16 and the synchronism pattern detecting position recorder 18 of information on a timing of the detection (P2→P4). Then, the synchronism controller 16 gives a permission for a decision of synchronism to the synchronism decider 12 (P2→P4).

The synchronism detector 12 decides, depending on an amount of bit errors output from the collator 10, whether the reception data and the expectation data are in synchronism (P4). If they are in synchronism, the decision of synchronism is continued to be made on the basis of a bit error amount (P4→P4).

If they are inconsistent in phase (synchronism disorder), the synchronism controller 16 resets the second data generator 54 to interrupt transmission of the expectation data (P4→P6). Then, the detection of synchronism pattern at the synchronism pattern detector 14 is stopped up to a position of synchronism pattern recorded in the synchronism pattern detecting position recorder 18 (P6).

Upon arrival to the position of synchronism pattern recorded in the synchronism pattern detecting position recorder 18, the synchronism pattern detecting position recorder 18 gives a permission for a detection of synchronism pattern to the synchronism pattern detector 14 (P6→P2), and the synchronism pattern detector 14 detects the synchronism pattern in the reception data (P2). Then, if the synchronism pattern is detected, the control flow goes to the synchronism deciding state (P4). Like this, even in the case of a failed synchronism due to a false synchronism pattern, the synchronization can be redone.

Figure 3:
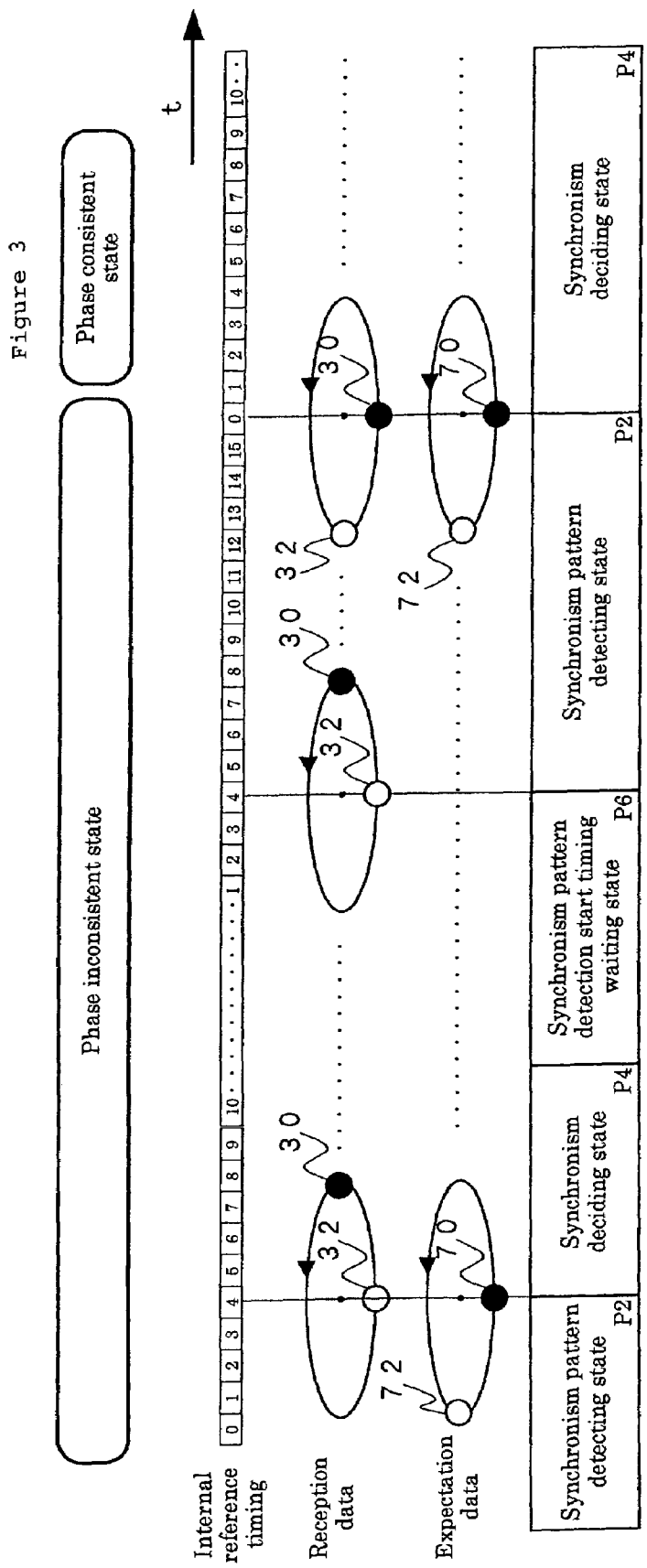
FIG. 3 is a diagram showing an example of obtaining a synchronization between reception data and expectation data of the first embodiment.

FIG. 3 is an example of reception data and the like. Using FIG. 3, an exemplary procedure is described to show how to obtain a synchronization. The reception data has a synchronism pattern 30 and a false synchronism pattern 32. The expectation data also has a synchronism pattern 70 and a false synchronism pattern 72. The synchronism pattern detecting position recorder 18 has an internal reference timing of an identical period to the reception data and the expectation data. If the false synchronism pattern 32 of the reception data is first mistaken as a synchronism pattern at a position of an internal reference timing 4, the timing is recorded in the synchronism pattern detecting position recorder 18 and occurrence of the expectation data starts, causing a transition from the synchronism pattern detecting state to a synchronism deciding state (P2→P4). The synchronism pattern detected from the reception data is the false synchronism pattern 32, which is different from the true synchronism pattern 30, and hence is decided to be inconsistent in phase at the synchronism decider 12, causing a transition from the synchronism deciding state to a synchronism pattern detection start timing waiting state (P6), where the second data generator 54 is initialized. Next, following an interruption of synchronism pattern detection up to the synchronism pattern detecting timing internal reference timing 4) recorded in the synchronism pattern detecting position recorder 18, there occurs a transition from the synchronism pattern detection start timing waiting state to a synchronism pattern detecting state (P6→P2) Thereafter, the true synchronism pattern 30 is detected at a position of an internal reference timing 0, causing a transition from the synchronism pattern detecting state to a synchronism deciding state (P2→P4), where a decision for a phase consistency is given at the synchronism decider 12, with an established synchronism.

It is now assumed that Tw0 is a time interval from the time when it is failed to obtain a synchronism to a start time of a detection of synchronism pattern, Ts0 is a time interval from the start time of the detection of synchronism pattern to a time when a synchronism pattern is detected, and Tc is a time interval for deciding whether or not a synchronism pattern of reception data and a synchronism pattern of expectation data are identical in phase.

Then, an average sync gain time Tsync0 is about 0.5 Np×(Tw0 in average+Ts0 in average+Tc in average), where Np is the number of synchronism patterns detected within one period.

According to the first embodiment, even with an inconsistency in phase due to a false synchronism pattern, the synchronism pattern detecting position recorder 18 allows for the synchronism pattern detector 14 to redo a detection of synchronism pattern from a timing (position) where a previous synchronism is obtained, so that a synchronism can be obtained between reception data and expectation data even with a phase inconsistency.

Second Embodiment

There will be described below a second embodiment of the invention with reference to the drawings. The second embodiment is different in that a timing (position) at which a synchronism pattern in reception data is detected is recorded in a synchronism pattern detecting timing recorder 20, and is used for a synchronization to be redone.

Figure 4:
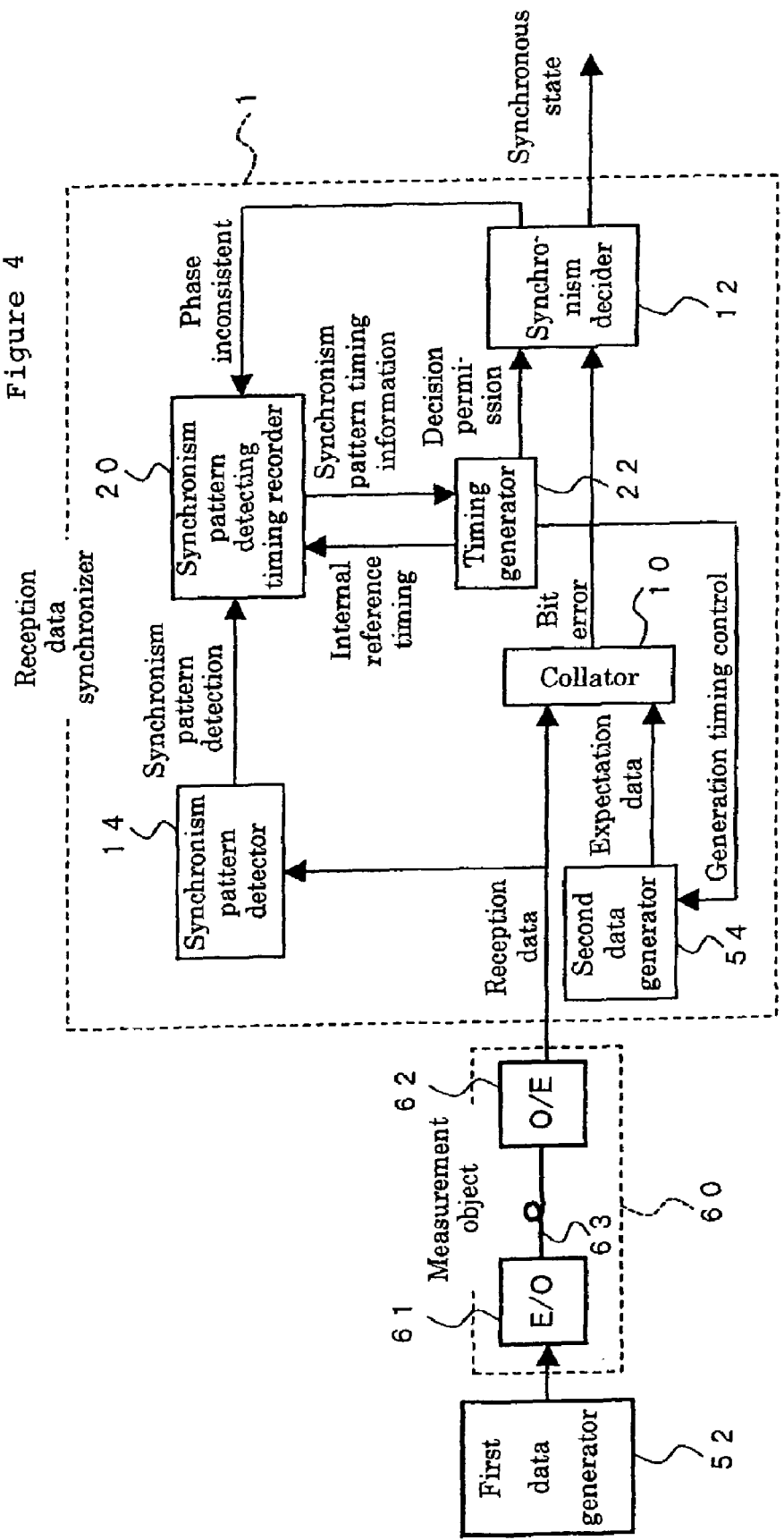
FIG. 4 is a block diagram showing the arrangement of a reception data synchronizer according to a second embodiment of the invention.

First, there is described the arrangement of a reception data synchronizer according to the second embodiment. Like parts to the first embodiment are designated by like reference characters, omitting their description. FIG. 4 is a block diagram showing the arrangement of the reception data synchronizer according to the second embodiment. Like parts to the first embodiment are designated by like reference numerals, omitting their description.

The reception data synchronizer 1 includes a collator 10, a synchronism decider 12, a synchronism pattern detector 14, the synchronism pattern detecting timing recorder 20, a timing generator 22, and a second data generator 54.

The synchronism decider 12, when deciding phases to be inconsistent, transmits the effect to the synchronism pattern detecting timing recorder 20 to be described later.

The synchronism pattern detector 14 detects a synchronism pattern from reception data, and makes a notification of the effect to the synchronism pattern detecting timing recorder 20 to be described later.

The synchronism pattern detecting timing recorder 20 is notified of a detection of the synchronism pattern from the synchronism pattern detector 14. Then, it receives an internal reference timing of the reception data synchronizer 1, from the timing generator 22 to be described later. Then, it records the internal reference timing at the time when the synchronism pattern is detected. Further, upon reception of a notification of phase inconsistency from the synchronism decider 12, it transmits the internal reference timing at the time when the synchronism pattern is detected, to the timing generator 22.

Upon reception of the internal reference timing at the time when the synchronism pattern is detected, the timing generator 22 gives a permission for synchronism decision to the synchronism decider 12. Moreover, it makes the second data generator 54 transmit therefrom expectation data so that a position of a synchronism pattern of the expectation data coincides with a position of the detected synchronism pattern. Further, it sends a predetermined reference timing signal (called an internal reference timing) to the synchronism pattern detecting timing recorder 20.

Figure 5:
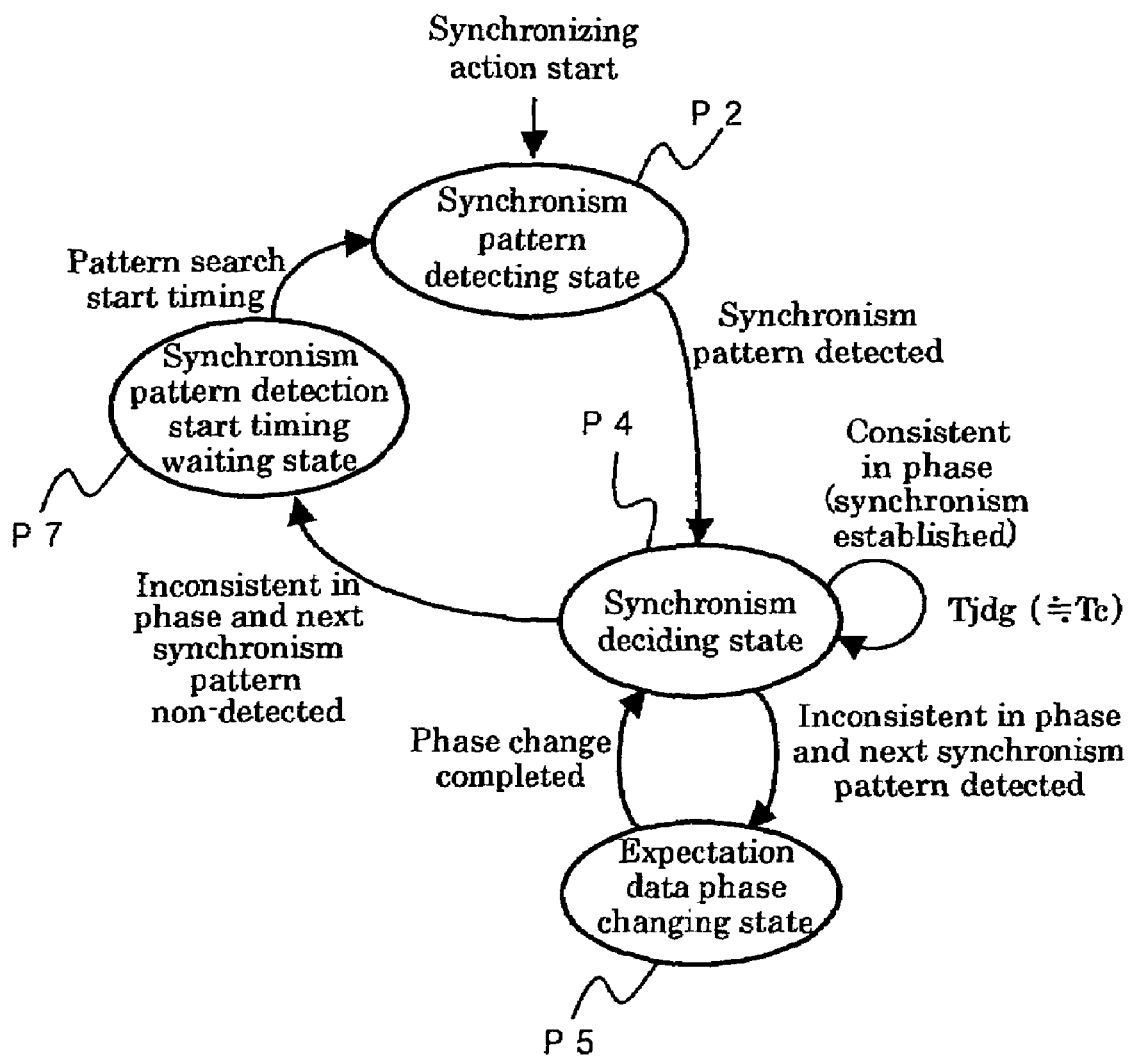
FIG. 5 is a status transition diagram showing actions of the second embodiment.

Next, there are described actions of the second embodiment by using a status transition diagram of FIG. 5. Tjdg is a required time at P4, while the Tjdg is substantially equal to Tc.

From the first pattern generator 52 is input reception data, via a DUT 60, to the synchronism pattern detector 14. At the synchronism pattern detector 14, there is detected a synchronism pattern in the reception data (P2).

The synchronism pattern detector 14 having detected the synchronism pattern in the reception data notifies the synchronism pattern detecting timing recorder 20 of the effect and a position of the synchronism pattern in the reception data. The synchronism pattern detecting timing recorder 20, receiving those, outputs to the timing generator 22 a signal (as synchronism pattern timing information) indicating a timing of detection of the synchronism pattern (P2→P4). Then, the timing generator 22 responds to the synchronism pattern timing information by controlling the second data generator 54 so that the position of the detected synchronism pattern of the reception data and the position of the synchronism pattern of the expectation data coincide with each other, and by giving a permission for a decision of synchronism to the synchronism decider 12 (P2→P4).

The synchronism detector 12 decides, depending on an amount of bit errors output from the collator 10, whether the reception data and the expectation data are in synchronism (P4). If they are in synchronism, the decision of synchronism is continued to be made on the basis of a bit error amount (P4→P4).

If they are inconsistent in phase (synchronism disorder), there is taken one of different processes depending on whether a subsequent synchronism pattern has already been detected or not. If an internal reference timing at the time when the synchronism pattern was detected has already been recorded in the synchronism pattern detecting timing recorder 20 (P4→P5), the timing generator 22 controls the second data generator 54 so that the synchronism pattern of the expectation data is matched with the internal reference timing at the time when the synchronism pattern was detected (P5). Then, when the matching of the synchronism pattern of the expectation data is finished (P5→P4), the control flow returns to the decision on whether or not synchronized (P4).

Unless an internal reference timing at the time when the synchronism pattern was detected has already been recorded in the synchronism pattern detecting timing recorder 20 (P4→P7), there is kept a waiting (P7) until an internal reference timing at the time when the synchronism pattern is detected is recorded in the synchronism pattern detecting timing recorder 20. Then, the synchronism pattern detecting timing recorder 20 sends an internal reference timing at the time when the synchronism pattern is detected to the timing generator 22, and there is made a decision of synchronism (P7→P2→P4).

Upon arrival to a position of synchronism pattern recorded last time, the synchronism pattern detecting timing recorder 20 restarts recording a detection timing of synchronism pattern (P6→P2). Then, if a synchronism pattern is detected, the control flow goes to a synchronism deciding state (P4). Like this, even in the case of a failed synchronism due to a false synchronism pattern, the synchronization can be redone.

Figure 6:
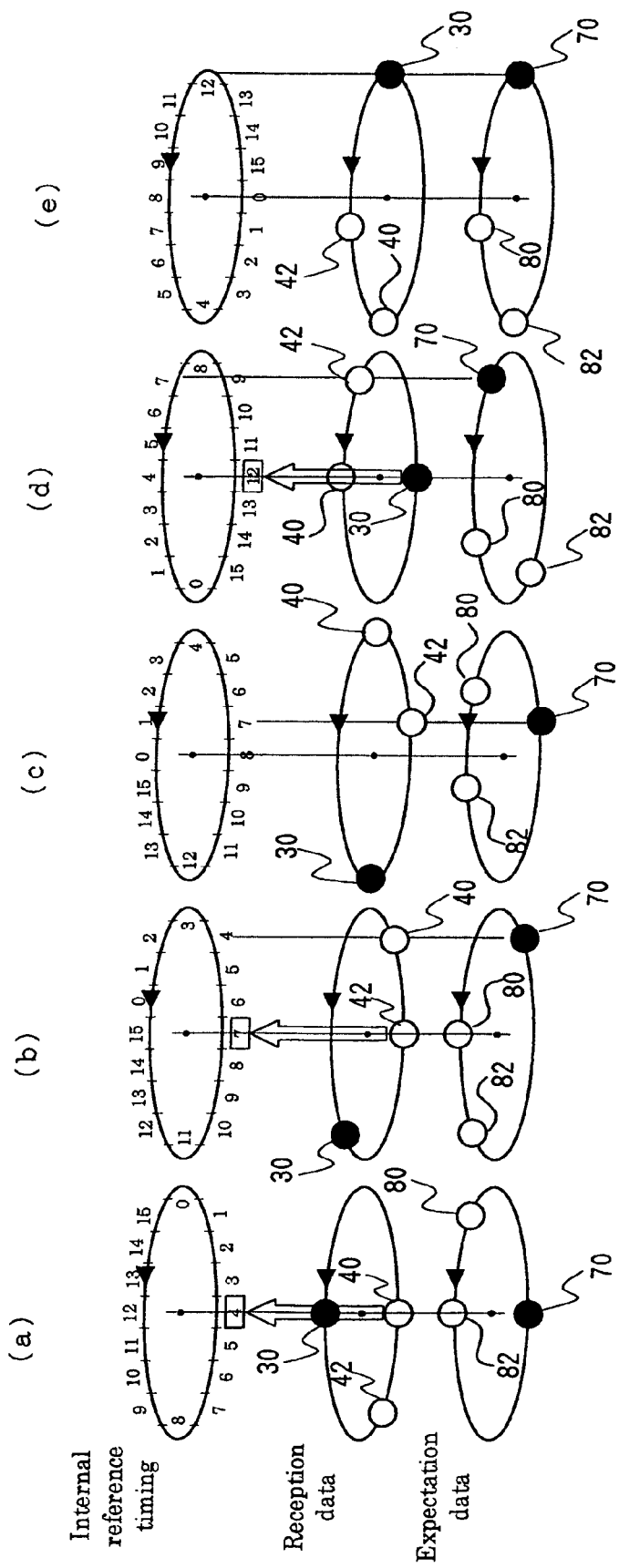
FIG. 6 is a diagram showing an example of obtaining a synchronization between reception data and expectation data of the second embodiment.

FIG. 6 is an example of reception data and the like. Using FIG. 6, an exemplary procedure is described to show how to obtain a synchronization. The reception data has a synchronism pattern 30 and false synchronism patterns 40, 42. The expectation data also has a synchronism pattern 70 and false synchronism patterns 80, 82.

First, if the false synchronism pattern 40 is mistaken as the synchronism pattern 30 by the synchronism pattern detector 14 (P2→P4), the timing generator 22 controls the second data generator 54 so that the synchronism pattern 70 of the expectation data is matched with a timing (position) 4 of the false synchronism pattern 40, to transmit the expectation data. Then, there is made a decision of synchronism between the reception data and the expectation data (P4), FIG. 6(*a*).

As a result, with no synchronism obtained, phases are inconsistent. However, as a timing (position) 7 of the false synchronism pattern 42 is recorded in the synchronism pattern detecting timing recorder 20 (P4→P5), FIG. 6(*b*), the timing generator 22 controls the second data generator 54 so that the synchronism pattern 70 of the expectation data is matched with the timing (position) 7 of the false synchronism pattern 42, to transmit the expectation data. Then, there is made a decision of synchronism between the reception data and the expectation data (P4), FIG. 6(*c*).

As a result, with no synchronism obtained, phases are inconsistent. However, as a timing (position) 12 of the synchronism pattern 30 is recorded in the synchronism pattern detecting timing recorder 20 (P4→P5), FIG. 6(*d*), the timing generator 22 controls the second data generator 54 so that the synchronism pattern 70 of the expectation data is matched with the timing (position) 12 of the synchronism pattern 30, to transmit the expectation data. Then, there is made a decision of synchronism between the reception data and the expectation data (P4), FIG. 6(*e*).

Now, with a synchronism obtained, there is continuously made a decision of synchronism (P4→P4).

According to the second embodiment, even with false synchronism patterns, the second data generator 54 can generate expectation data for a synchronization to be redone, in accordance with a timing when a synchronism pattern recorded in the synchronism pattern detecting timing recorder 20 is detected, so that a synchronism can be obtained between reception data and expectation data.

Further, in the second embodiment, a sync gain time is (an average required time for a single decision of phase consistency)×Np at the longest, or 0 at the shortest, and an average sync gain time is (the average required time for a single decision of phase consistency)×Np/2. The average required time for a single decision of phase consistency is substantially equal to an average of Tc, and can be shortened by 0.5 Np×(Tw0 in average+Ts0 in average) in comparison with the first embodiment. Thus, the average sync gain time can be rendered small. Therefore, bit errors can be detected in a short bit sequence such as a burst data.

For example, assuming a case of data having a pattern length of 1M bits, a data rate of 100 Mbps, and an Np of 10, then Tw0 is 0 at the shortest or identical in time to one period of data at the longest. Therefor, an average Tw0 is (one period of data)/2. An average Ts0 is (one period of data)/ (2*Np)(Ts0 to be 0 at the shortest or one period of data/Np at the longest). Therefore, in the first embodiment, Tw0 in average=(1M/1000M)/2=0.005 [s]=5 [ms], Ts0 in average= (1M/100M)/(2×10)=0.0005 [s]=0.5 [ms], and Tc in average=1 [ms]. Therefore, the average sync gain time=(10/2)× (5+0.5+1)=32.5 [ms]. On the other hand, in the second embodiment, the average sync gain time=(10/2)×Tc=5 [ms]. As will be seen from this example, the average sync gain time in the second embodiment is shorter than the average sync gain time in the first embodiment.

Third Embodiment

There will be described below a third embodiment of the invention with reference to the drawings. In comparison with the second embodiment using the synchronism pattern detecting timing recorder 20, the third embodiment is different in that it uses a phase difference recorder 26 for recording a phase difference between a detected synchronism pattern and an initially detected synchronism pattern or a phase difference between a detected synchronism pattern and a synchronism pattern detected in a previous time.

Figure 7:
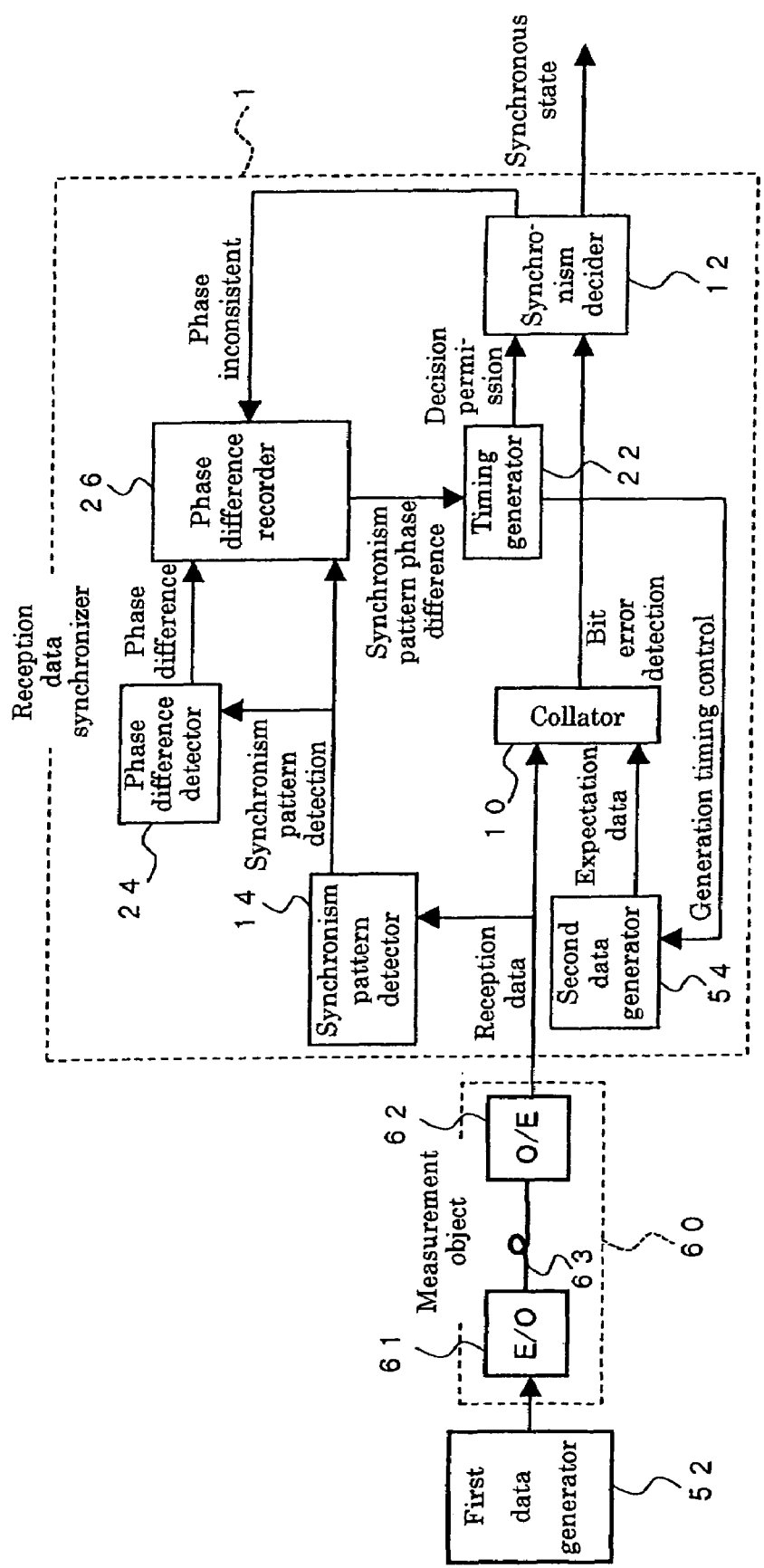
FIG. 7 is a block diagram showing the arrangement of a reception data synchronizer according to a third embodiment of the invention.
Figure 8:
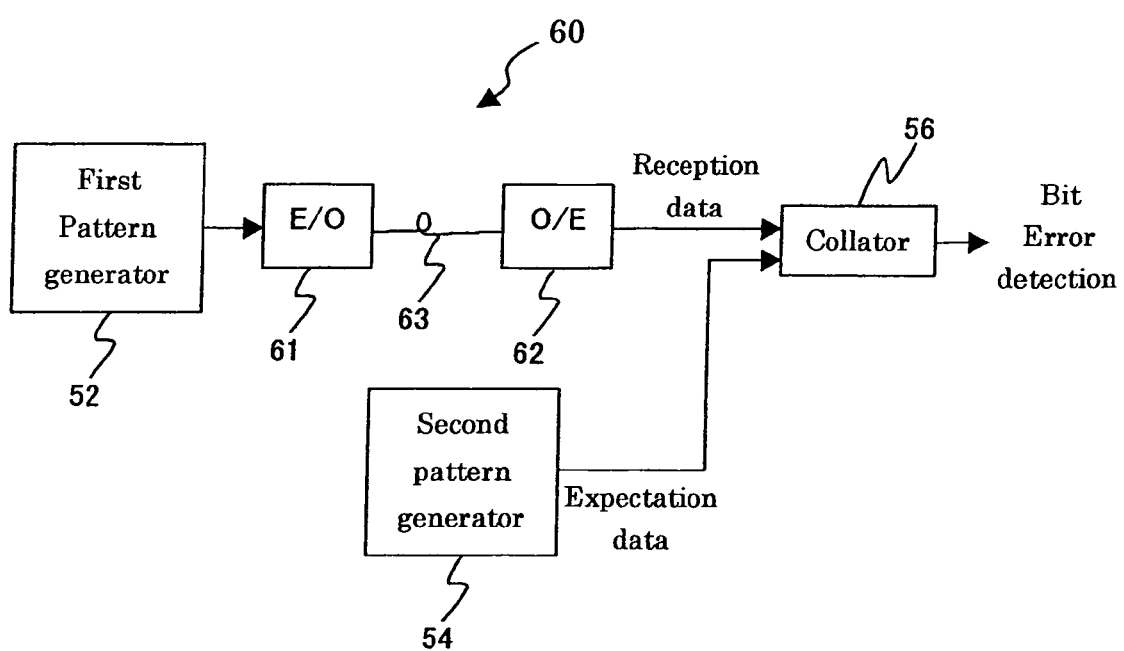
FIG. 8 is a block diagram showing a system arrangement for performing a bit error detection in the prior art.

First, there is described the arrangement of a reception data synchronizer according to the third embodiment. Like parts to the first embodiment are designated by like reference characters, omitting their description. FIG. 7 is a block diagram showing the arrangement of the reception data synchronizer according to the third embodiment. Like elements to the first embodiment are designated by like reference numerals, omitting their description.

The reception data synchronizer 1 includes a collator 10, a synchronism decider 12, a synchronism pattern detector 14, a timing generator 22, a phase difference detector 24, the phase difference recorder 26, and a second data generator 54.

The phase difference detector 24, having received a notification of a detected synchronism pattern from the synchronism pattern detector 16, detects a phase difference between the detected synchronism pattern and an initially detected synchronism pattern or a phase difference between the detected synchronism pattern and a synchronism pattern detected in a previous time, and sends it to the phase difference recorder 26 to be described later. The phase difference recorder 26 records the phase difference detected by the phase difference detector 24.

Actions of the third embodiment are analogous to the second embodiment, but for the difference that a phase difference is used. The phase difference is used for changing phases of expectation data (P5, see FIG. 5). As a description using an example of FIG. 6, in the second embodiment, the synchronism pattern 70 of the expectation data is matched with the internal reference timings 4, 7, and 12, one by one in this order.

In the third embodiment, there are recorded in the phase difference recorder 26 a timing 4 at which a synchronism pattern is initially detected, a difference 3 (7−4) between a timing at which the synchronism pattern is detected twice and the timing at which the synchronism pattern is initially detected, and a difference 8 (12−4) between a timing at which the synchronism pattern is detected thrice and the timing at which the synchronism pattern is initially detected, and unless a synchronism is obtained at the timing 4, the timing of the synchronism pattern 70 is shifted by 3 to make a decision of synchronism at a resultant timing, and unless a synchronism is then obtained, the timing of the synchronism pattern 70 is shifted by 8 from the initial to make a decision of synchronism at a resultant timing.

Or, in the third embodiment, there are recorded in the phase difference recorder 26 the timing 4 at which the synchronism pattern is initially detected, the difference 3 (7−4) between the timing at which the synchronism pattern is detected twice and the timing at which the synchronism pattern is initially detected, and a difference 5 (12−7) between the timing at which the synchronism pattern is detected thrice and the timing at which the synchronism pattern is detected twice, and unless a synchronism is obtained at the timing 4, the timing of the synchronism pattern 70 is shifted by 3 to make a decision of synchronism at a resultant timing, and unless a synchronism is then obtained, the timing of the synchronism pattern 70 is further shifted by 5 to make a decision of synchronism at a resultant timing.

Like effects to the second embodiment can be achieved by the third embodiment also.

According to the present invention, there can be obtained a synchronization between reception data and expectation data even with an inconsistency in phase due to a false synchronism pattern.

What is claimed is:

1. A reception data synchronizing apparatus for obtaining synchronization between reception data having a plurality of synchronism patterns and expectation data as an expected value of the reception data, comprising:
   a synchronism pattern detecting timing recording means for recording a first synchronism pattern detecting timing at which a first of the plurality of synchronism patterns is detected;
   a collation and synchronism decision means for collating the reception data with the expectation data to decide whether or not the reception data is consistent in phase with the expectation data according to the first synchronism timing;
   wherein the synchronism pattern detecting timing recording step records a second synchronism timing as the first synchronism timing, when the collation and synchronism decision means gives a decision for inconsistency in phase, and wherein said second synchronism timing is a timing at which a second of the plurality of synchronism patterns is detected.

2. The reception data synchronizing apparatus according to claim 1, wherein a predetermined reference timing signal is transmitted and the synchronism pattern detecting timing recording means records the reference timing signal when the synchronism pattern is detected, as the synchronism pattern detecting timing.

3. A reception data synchronizing method for obtaining synchronization between reception data having a plurality of synchronism patterns and expectation data as an expected value of the reception data, comprising:
   a synchronism pattern detecting timing recording step for recording a synchronism pattern detecting timing at which a first of the plurality of synchronism patterns is detected;
   a collation and synchronism decision step for collating the reception data with the expectation data to decide whether or not the reception data is consistent in phase with the expectation data according to the first synchronism timing;
   wherein the synchronism pattern detecting timing recording step records a second synchronism timing as the first synchronism timing, when the collation and synchronism decision step gives a decision for inconsistency in phase, and wherein said second synchronism timing is a timing at which a second of the plurality of synchronism patterns is detected.

4. The reception data synchronizing method according to claim 3 wherein a predetermined reference timing signal is transmitted and the synchronism pattern detecting timing recording step records the reference timing signal when the synchronism pattern is detected, as the synchronism pattern detecting timing.

5. A computer-readable medium embodying a program of instructions for execution by the computer to perform a reception data synchronizing method for obtaining synchronization between reception data having a plurality of synchronism patterns and expectation data as an expected value of the reception data, comprising:

a synchronism pattern detecting timing recording step for recording a synchronism pattern detecting timing at which a first of the plurality of synchronism patterns is detected;

a collation and synchronism decision step for collating the reception data with the expectation data to decide whether or not the reception data is consistent in phase with the expectation data according to the first synchronism timing wherein the synchronism pattern detecting timing recording step records a second synchronism timing as the first synchronism timing, when the collation and synchronism decision step gives a decision for inconsistency in phase, and wherein said second synchronism timing is a timing at which a second of the plurality of synchronism patterns is detected.

6. The computer-readable medium according to claim 5, wherein a predetermined reference timing signal is transmitted, and the synchronism pattern detecting timing recording step records the reference timing signal when the synchronism pattern is detected, as the synchronism pattern detecting timing.

7. A reception data synchronizing apparatus for obtaining synchronization between reception data having a plurality of synchronism patterns and expectation data as an expected value of the reception data, comprising:

a synchronism pattern detecting timing recording device that records a first synchronism pattern detecting timing at which a first of the plurality of synchronism patterns is detected;

a collation and synchronism decision device that collates the reception data with the expectation data to decide whether or not the reception data is consistent in phase with the expectation data according to the first synchronism timing, wherein the synchronism pattern detecting timing recording device records a second synchronism timing as the first synchronism timing, when the collation and synchronism decision device gives a decision for inconsistency in phase, and wherein said second synchronism timing is a timing at which a second of the plurality of synchronism patterns is detected.

8. The reception data synchronizing apparatus according to claim 7, wherein a predetermined reference timing signal is transmitted, and the synchronism pattern detecting timing recording device records the reference timing signal when the synchronism pattern is detected, as the synchronism pattern detecting timing.

* * * * *